US010355290B2

(12) United States Patent
Eickhoff et al.

(10) Patent No.: US 10,355,290 B2
(45) Date of Patent: Jul. 16, 2019

(54) HIGH POWER FUEL CELL SYSTEM (71) Applicant: Honeywell International Inc., Morris Plains, NJ (US)

(72) Inventors: Steven J. Eickhoff, Brooklyn Park, MN (US); Jeffrey Michael Klein, Minneapolis, MN (US)

(73) Assignee: Honeywell International Inc., Morris Plains, NJ (US)

( * ) Notice: Subject to any disclaimer, the term of this patent is extended or adjusted under 35 U.S.C. 154(b) by 77 days.

(21) Appl. No.: 15/466,644

(22) Filed: Mar. 22, 2017

(65) Prior Publication Data

US 2018/0277860 A1  Sep. 27, 2018

(51) Int. Cl.
*H01M 8/04* (2016.01)
*H01M 8/24* (2016.01)
*H01M 8/06* (2016.01)
*H01M 8/04029* (2016.01)
*H01M 8/065* (2016.01)
(Continued)

(52) U.S. Cl.
CPC ..... *H01M 8/04029* (2013.01); *H01M 2/1282* (2013.01); *H01M 4/86* (2013.01); *H01M 8/0432* (2013.01); *H01M 8/04089* (2013.01); *H01M 8/04097* (2013.01); *H01M 8/04141* (2013.01); *H01M 8/04208* (2013.01); *H01M 8/04373* (2013.01); *H01M 8/04753* (2013.01); *H01M 8/065* (2013.01); *H01M 8/2457* (2016.02); *H01M 16/006* (2013.01);
(Continued)

(58) Field of Classification Search
CPC ....... H01M 8/04; H01M 8/04029; H01M 8/24
See application file for complete search history.

(56) References Cited

U.S. PATENT DOCUMENTS 5,401,589 A  3/1995  Palmer et al.
6,329,090 B1  12/2001  Mcelroy et al.
(Continued)

FOREIGN PATENT DOCUMENTS

| CN | 108630969 A | 10/2018 |
| JP | 2009-099491 A | 5/2009 |
| WO | 2017195045 | 11/2017 |

OTHER PUBLICATIONS

Majsztrik, P. W., et al., "Water sorption, desorption and transport in Nafion membranes", *Journal of Membrane Science*, 301, (2007), 93-106.
(Continued)

*Primary Examiner* — Kenneth J Douyette
(74) *Attorney, Agent, or Firm* — Schwegman Lundberg & Woessner, P.A.

(57) ABSTRACT

A power generator and method include passing ambient air via an ambient air path past a cathode side of the fuel cell to a water exchanger, picking up water from the cathode side of the fuel cell and exhausting air and nitrogen to ambient, passing hydrogen via a recirculating hydrogen path past an anode side the fuel cell to the water exchanger, where the water exchanger transfers water from the ambient air path comprising a cathode stream to the recirculating hydrogen path comprising an anode stream, and passing the water to a hydrogen generator to add hydrogen to the recirculating hydrogen path and passing the hydrogen via the recirculating hydrogen path past the anode side of the fuel cell.

12 Claims, 9 Drawing Sheets

(51) Int. Cl.
*H01M 8/04089* (2016.01)
*H01M 8/04119* (2016.01)
*H01M 8/04082* (2016.01)
*H01M 8/0432* (2016.01)
*H01M 8/04746* (2016.01)
*H01M 8/2457* (2016.01)
*H01M 2/12* (2006.01)
*H01M 4/86* (2006.01)
*H01M 16/00* (2006.01)
*C01B 3/06* (2006.01)

(52) U.S. Cl.
CPC ..... *C01B 3/065* (2013.01); *H01M 2004/8684* (2013.01); *H01M 2004/8689* (2013.01)

(56) References Cited

U.S. PATENT DOCUMENTS

| | | | |
|---|---|---|---|
| 8,172,928 | B2 | 5/2012 | Eickhoff et al. |
| 9,214,683 | B2 | 12/2015 | Eickhoff et al. |
| 2002/0018922 | A1* | 2/2002 | Fuglevand ........ H01M 8/04007 429/429 |
| 2002/0025462 | A1 | 2/2002 | Nakanishi et al. |
| 2002/0045079 | A1 | 4/2002 | Shimada et al. |
| 2003/0091877 | A1 | 5/2003 | Xuesong et al. |
| 2004/0013913 | A1* | 1/2004 | Fabis ................ H01M 8/04007 429/442 |
| 2004/0033410 | A1 | 2/2004 | Brady et al. |
| 2005/0136300 | A1 | 6/2005 | Dyer |
| 2006/0014059 | A1 | 1/2006 | Wood |
| 2006/0177708 | A1 | 8/2006 | Koyama et al. |
| 2007/0026272 | A1 | 2/2007 | Liu et al. |
| 2007/0048569 | A1* | 3/2007 | Fujita ................ H01M 8/04186 429/415 |
| 2007/0298298 | A1* | 12/2007 | Ishigaki ............ H01M 8/04014 429/429 |
| 2009/0145847 | A1 | 6/2009 | Spiegelman et al. |
| 2009/0297899 | A1 | 12/2009 | Ku et al. |
| 2011/0027668 | A1 | 2/2011 | Bae et al. |
| 2011/0129745 | A1 | 6/2011 | Givens et al. |
| 2012/0040256 | A1* | 2/2012 | Kani ...................... C01B 3/384 429/410 |
| 2012/0094196 | A1 | 4/2012 | Eickhoff et al. |

OTHER PUBLICATIONS

"European Application Serial No. 18156672.0, Extended European Search Report dated Jul. 2, 2018", 8 pgs.

"European Application Serial No. 18156672.0, Response filed Oct. 17, 2018 to Extended Search Report dated Jul. 2, 2018", 64 pgs.

* cited by examiner

| Component | 1200W 8kWh Design | | | 1200W 12kWh Design | | |
|---|---|---|---|---|---|---|
| | Initial mass (g) | Final mass (g) | Volume (cc) | Initial mass (g) | Final mass (g) | Volume (cc) |
| Fuel Cell/Water exchanger | 134 | 134 | 135 | 134 | 134 | 135 |
| Fuel cartridge | 2250 | 4250 | 3520 | 3375 | 6375 | 5280 |
| Power/control electronics and Li-Capacitor | 197 | 197 | 39 | 197 | 197 | 39 |
| Pump, Fan/heat sink | 210 | 210 | 500 | 210 | 210 | 500 |
| Housing | 91 | 91 | 65 | 137 | 137 | 98 |
| Flow channel | 0 | 0 | 650 | 0 | 0 | 650 |
| Total: | 2882 | 4882 | 4909 | 4053 | 7053 | 6702 |

HIGH POWER FUEL CELL SYSTEM

BACKGROUND

The run time of unmanned air systems (UAS) aka drones is limited by their power sources. State of the art UAS use light-weight lithium ion/polymer batteries with specific energies that range from ~200-300 Wh/kg, enabling flight times on the order of 20-60 min. Emerging applications including infrastructure inspection (e.g. roads, bridges, power lines, rail, pipelines, etc) and package delivery may be desired to have greater flight times on a battery charge. In some instances, greater than six-hour flight times are desired in order for such as UAS to be commercially viable.

Efficient energy storage and utilization faces many obstacles. Proton exchange membrane (PEM) fuel cells for man-portable power and micro air vehicles require light-weight, small-size, and high-rate hydrogen sources. Commercially available hydrogen sources such as metal hydrides, compressed hydrogen in cylinders, or catalytic water borohydride hydrogen generators are capable of high rate hydrogen generation, but are heavy and bulky.

While some hydrogen generators are light-weight and have small size, they are incapable of generating hydrogen at a sufficiently high rate for many applications.

SUMMARY

A fuel cell based power generator includes a fuel cell element, a water exchanger element, a hydrogen generator element, an ambient air path configured to receive ambient air and provide the ambient air across a cathode side of the fuel cell element, receive water from the fuel cell element and provide wet air to the water exchanger element, and a recirculating hydrogen air path configured to receive hydrogen from the hydrogen generator element, provide the hydrogen past an anode side the fuel cell element to the water exchanger element and provide wet hydrogen back to the hydrogen generator.

A method include passing ambient air via an ambient air path past a cathode side of the fuel cell to a water exchanger, picking up water from the cathode side of the fuel cell and exhausting air and nitrogen to ambient, passing hydrogen via a recirculating hydrogen path past an anode side the fuel cell to the water exchanger, where the water exchanger transfers water from the ambient air path comprising a cathode stream to the recirculating hydrogen path comprising an anode stream, and passing the water to a hydrogen generator to add hydrogen to the recirculating hydrogen path and passing the hydrogen via the recirculating hydrogen path past the anode side of the fuel cell.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software in one embodiment. The software may consist of computer executable instructions stored on computer readable media or computer readable storage device such as one or more non-transitory memories or other type of hardware based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

The run time of unmanned air systems (UAS) aka drones is limited by their power sources. State of the art UAS use light-weight lithium ion/polymer batteries with specific energies that range from ~200-300 Wh/kg, enabling flight times on the order of 20-60 min. Emerging applications including infrastructure inspection (e.g. roads, bridges, power lines, rail, pipelines, etc) and package delivery require longer flight times in order to be commercially viable. In various embodiments, a high specific energy power source including a fuel cell may be used for battery powered devices, such as a UAS, capable of providing 10-12× the run time of state of the art lithium batteries. Some embodiments may provide six to twelve or more hours of flight time.

A hybrid fuel cell power generator provides run time improvement and energy efficiency under specified load power profiles. Moreover, the hybrid fuel cell power generator may be substantially lighter than prior energy storage devices and may have lower projected lifecycle costs, without compromising operation temperature range or environmental and safety performance. A revolutionary improvement in runtime lies in the innovative fuel-cell technology and its fuel chemistry based on lithium aluminum hydride (LAH) that requires no net water consumption in order to sustain its operation, thus eliminating the need for a water fuel reservoir, which enables the energy source to be substantially smaller and lighter than other conventional chemical hydride or direct methanol fuel cells with on-board storage of water (fuel, diluent, or solvent).

Figure 1:
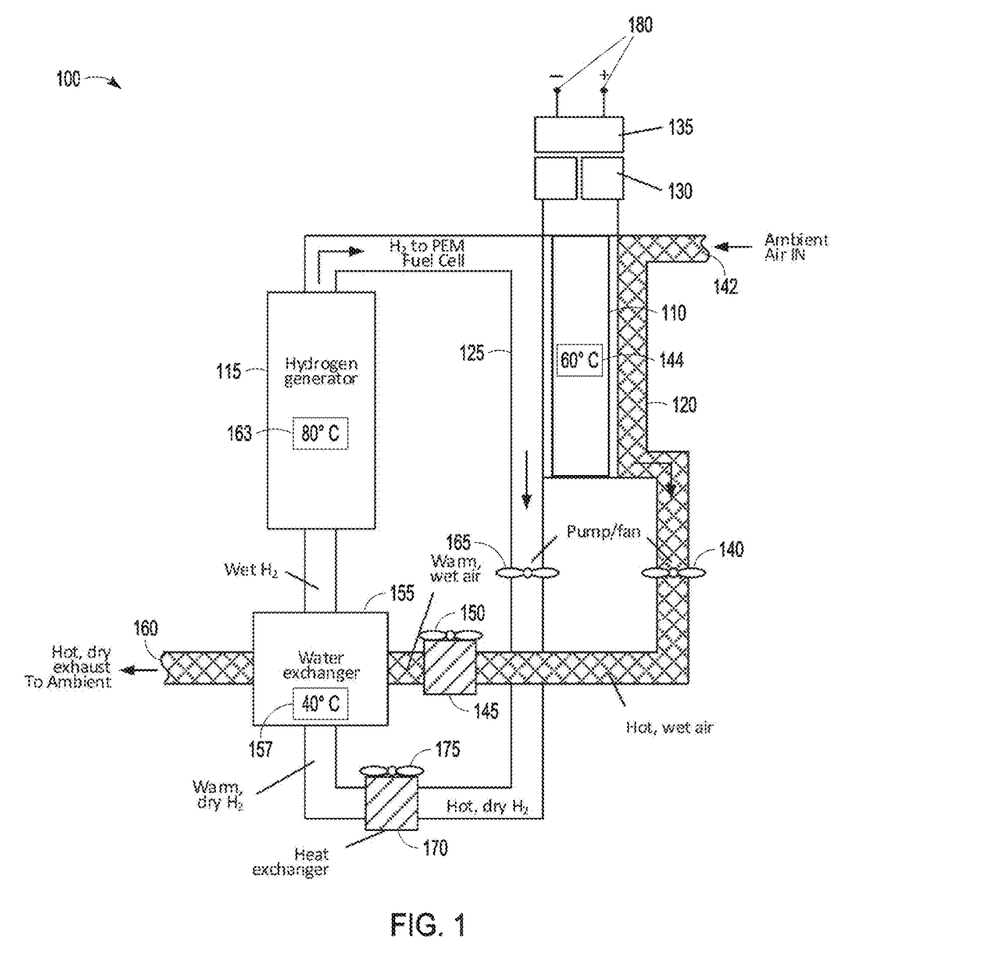
FIG. 1 is a schematic diagram of a power generator having a recirculating hydrogen path past a fuel cell and hydrogen generator according to an example embodiment.

A fuel cell based power generator is illustrated at 100 in schematic form in FIG. 1. In one embodiment power generator 100 includes a fuel cell 110 and a hydrogen generator 115. An ambient air path 120 is configured to run ambient air past a cathode side of the fuel cell 110. A reaction in the fuel cell 110 adds water to the ambient air path 120, providing it to the hydrogen generator 115, which contains one or more fuels that release hydrogen responsive to exposure to water, which may be in the form of humidity. The hydrogen generator 115 provides the released hydrogen to a recirculating hydrogen path 125, which runs past the anode side of the fuel cell 110 to provide the hydrogen. Hydrogen from the recirculating hydrogen path 125 reacts with oxygen from the ambient air path 120 in fuel cell 110, producing water vapor and heat as reactions byproducts, which is removed from the fuel cell by the air flowing within ambient airflow path 120. Nitrogen and leftover hydrogen continues on through the recirculating hydrogen path 120.

In one embodiment, electricity generated by the fuel cell 110 is provided for storage in one or more batteries, such as li-ion rechargeable batteries. Power management circuitry 135 may utilize the ultra-high-power rechargeable battery 120, such as a Li-ion battery manufactured by Saft America Inc., that is capable of handling various load power profiles with significant transient fluctuations. Other rechargeable batteries may be used in further embodiments.

In one embodiment, the fuel cell based power generator 100 has a system configuration (implemented in a X590 form factor battery package in one embodiment) and operating principle are schematically depicted in FIG. 1. Hydrogen generator 115 in one embodiment is a replaceable and disposable "fuel-cartridge" unit that generates $H_2$ for a $H_2$/oxygen proton exchange membrane (PEM) fuel cell 110, and a permanent unit that in one embodiment includes (PEM) fuel cell 110, Li-ion recharge battery 130 as an output stage to interface with an external load, and the power management module 135 that controls electronic and fluidic control circuits (controlling multiple fans) to dynamically sense and optimize the power generator 100 under varying load and environmental conditions.

The fuel cell based power generator 100 in various embodiment may include one or more of the following innovative aspects:

Hybridization between a fuel cell and Li-ion rechargeable batteries maximizes total energy and extraction efficiency to meet load power profiles with transients Ultra high power lithium-ion rechargeable batteries enabling high power management efficiency Water-less fuel cell operation scavenges water in vapor from its cathode and uses it as fuel in the H2 generation process, enabling longer runtime and lighter weight than a BA5590 lithium battery:

High fuel energy density (>3100 Whr/liter) and specific energy (>3300 Whr/kg)

Broad environmental operating and storage range

LAH-based fuel chemistry (water-vapor driven reaction), and engineered fuel formulation (particle size and porosity) enabling >95% fuel utilization at high power Replaceable and disposable fuel-cartridge configuration enabling further enhanced runtime and weight advantages for extended mission duration and reduced lifecycle cost Hot-swappable fuel cartridges for uninterrupted power Ambient air serves as the hybrid fuel cell power generator 100 oxygen source, carrier gas for the water vapor fuel, and coolant gas for the fuel cell stack and $H_2$ generator. A first fan 140 draws in fresh air from ambient via an inlet 142, circulates it over the cathode side of the fuel cell stack via an ambient air path or passage 120. Since the fuel cell 110 reaction is exothermic, the temperature of the fuel cell 110 increases as may be measured by a first temperature sensor represented at 144, which is positioned to measure the temperature of the fuel cell 110. A fuel cell set point temperature of the fuel cell 110 is indicated as 60° C., which has been found to be a temperature at which the fuel cell 110 functions most efficiently due to increased proton conductivity. In further embodiments, the set point may vary between 60° C. and 80° C., and may vary further depending on the configuration and specific materials. Different optimal set points for the fuel cell may be determined experimentally for different fuel cells and may be found to be outside the range specified above. The control electronics 135 may use PID type control algorithms to control the first fan 140 speed to maintain the fuel cell temperature at its set point. Other control algorithms may be used in further embodiments, such modeling and any other type of algorithm sufficient to control the temperature to the set point by controlling the first fan 140 speed.

The ambient air path 120 continues through a first heat exchanger 145 with a second fan 150, and then through water exchanger 155. The water exchanger 155 operates optimally at a water exchanger set point temperature as indicated at 157, which also represents a temperature sensor configured to sense the temperature of the water exchanger 157. The water exchanger 157 extracts water from warm wet air exiting the heat exchanger 145, and exhausts hot, dry exhaust to ambient at 160. The fan 150 of heat exchanger 145 may be controlled in the same manner as fan 140 to maintain the flow of warm wet air to the water exchanger 155 to maintain the water exchanger 157 at its set point temperature, which in one embodiment is 40° C. and may vary from 40° C. to 60° C. in some embodiments, or outside that range depending on the type of water exchanger utilized.

The hydrogen generator 115 also has a set point temperature at which it operates most efficiently as represented at 163, which also represents a suitably positioned temperature sensor. The hydrogen generator experiences an exothermic reaction and has an optimal operating set point is shown as 80° C., but may vary from 60° C.-100° C. or outside the range depending on the composition of the hydrogen generator used. The hydrogen generator temperature may be controlled by varying a speed of a hydrogen path fan or pump 165 via the control electronics 135 in a similar manner as that used for the other fans, such as RID type control algorithms. Faster operation of the various fans generally lowers the temperature of the corresponding element.

The hydrogen path 125 does not dead-end at the fuel cell as that can result in the accumulation of reaction byproducts, such as nitrogen building in the fuel cell resulting in hydrogen starvation in the fuel cell and decreased performance. Rather, the hydrogen path 125 continues past the fuel cell, preventing build-up of nitrogen and providing a continuous flow of hydrogen to the fuel cell. The hydrogen path 125 carries hot, dry $H_2$ to a hydrogen path heat exchanger 170 having a fan 175 controlled by the control electronics to reduce the temperature of the hot, dry $H_2$ to warm dry $H_2$ provided to the water exchanger 155 based on temperature sensor 157. In some embodiments, heat exchanger 170 may be positioned in the flow path between the hydrogen generator and fuel cell, to better optimize the temperature of the fuel cell. In further embodiments, the temperature sensor 157 may comprise multiple different temperature sensors measuring the temperature in both ambient and hydrogen paths between the heat exchangers 145 and 170 and the water exchanger 157. Such different temperature sensors may be used to either independently control fans 150 and 175 to provide their exhausts at temperatures suitable for the set point of the water exchanger. In further embodiments, the control of the heat exchanger fans may be interdependent to maintain the water exchanger at the desired set point. The water exchanger 155 thus receives warm wet air from the ambient path, and warm dry $H_2$ from the recirculating hydrogen path, and provides wet $H_2$ to the hydrogen generator, while exhausting hot, dry exhaust which may include nitrogen, to ambient.

Three elements are shown as having different set points at which they operate most efficiently, the water exchanger 155, the hydrogen generator 115, and the fuel cell 110. Each is shown as having a different set point with temperature controlled by fan speed. The control may be independent for each element, or in some embodiments that may utilize a model based control algorithm, the control may be provided interdependently based on the model.

In a further embodiment, one or more of the elements whose temperature is controlled may include a heater, such as a resistive heater powered by the battery to initially heat the element when the PEM fuel cell based generator is being started. While the elements will reach operating ranges without addition heaters, the heaters can assist the element or elements to reach an optimal operation temperature more quickly, enabling a power device to operate at full power more quickly.

In one embodiment, as gases passes by the fuel cell stack from the ambient path 120 and the recirculating hydrogen path 125, oxygen is consumed by the fuel cell, and water vapor and waste heat are absorbed. Nitrogen is included with the hot, dry $H_2$ in the hydrogen path 125, and water vapor and air in the ambient path 120.

As the air passes through the $H_2$ generator, it also absorbs waste heat from the fuel. The electrical power generated in the fuel cell stack may be fed to power management circuitry 135 which conditions the power and provides it to a load as indicated by contacts 180. A suite of sensors may measure, in addition to the temperature sensor previously described, humidity, and pressure throughout the system 100. Data provided by the sensors, as well as the electrical load and charge state of the Li-ion rechargeable batteries 120 are used by the control electronics 135 to determine and set the various fan speeds to control the temperature of the elements to corresponding set points.

Fuel consumption may also be monitored, and the remaining capacity may be displayed on the hybrid fuel cell power generator packaging in various embodiments. In one embodiment, greater than 95% fuel utilization may be achieved through optimized LAH fuel formation (porosity, particle size/distribution, rate enhancing additives).

In some embodiments, the LAH-water reaction generates a substantial amount of heat (150 kJ/mol LAH, exothermic) leading to a rise in temperature in the fuel. The temperature may be monitored along with controlling airflow over the stack to maintain temp at a desired set point for optimal operation.

Electrochemical system power performance can substantially degrade at low temperatures (−40° C.) due to slower reaction kinetics and lower electrolyte conductivity. The hybrid fuel cell may avoid freezing problems by 1) using water in vapor form, 2) adjusting airflow to prevent water vapor condensation, and 3) using heat generated by the fuel cell stack and 112 generator to regulate the temperature of the fuel cell stack and fuel rods.

In some embodiments, noryl plastic packaging consistent with the type used on the Saft BA5590 may be used. Many different types of plastics and other materials that provide low weight yet sufficient tolerance to the operating parameters and environmental conditions of the generator may be used.

Hydrogen generator 115 in one embodiment is a high-rate hydrogen generator suitable for man-portable power and micro air vehicle applications that provides 4-5× the hydrogen of commercially available hydrogen sources of the same size and weight. Many different hydrogen producing fuels, such as LAH may be used. In further embodiments, the hydrogen producing fuel may include $LiAlH_4$, $NaAlH_4$, $KAlH_4$, $MgAlH_4$, $CaH_2$, $LiBH_4$, $NaBH_4$, $LiH$, $MgH_2$, $Li_3Al_2$, $CaAl_2H_8$, $Mg_2Al_3$, alkali metals, alkaline earth metals, alkali metal silicides, or any combinations thereof.

The term "about" as used herein can allow for a degree of variability in a value or range, for example, within 10%, within 5%, or within 1% of a stated value or of a stated limit of a range, and includes the exact stated value or range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more, or 100%.

Hydrogen-Generating Composition for a Fuel Cell.

In various embodiments, the present invention provides a hydrogen-generating composition for a fuel cell. The hydrogen-generating composition can include a hydride and a Lewis acid. The hydrogen-generating composition can be combined with water to generate hydrogen gas. The phase of the water contacted with the hydrogen-generating composition to generate the hydrogen gas can be any suitable phase, such as liquid water (e.g., in a pure state, diluted state, or such as having one or more compounds or solvents dissolved therein) or gaseous water (e.g., water vapor, at any suitable concentration). The generated hydrogen gas can be used as the fuel for a hydrogen-consuming fuel cell.

The hydrogen-generating composition can be in any suitable form. The hydrogen-generating composition can be in the form of a loose powder, or a compressed powder. The hydrogen-generating composition can be in the form of grains or pellets (e.g., a powder or grains compressed into pellets). The hydrogen-generating composition can have any suitable density, such as about 0.5 g/cm$^3$ to about 1.5 g/cm$^3$, or about 0.5 g/cm$^3$ or less, or less than, equal to, or greater than about 0.6 g/cm$^3$, 0.7, 0.8, 0.9, 1, 1.1, 1.2, 1.3, 1.4 g/cm$^3$, or about 1.5 g/cm$^3$ or more.

In some embodiments, when contacted with water the hydrogen-generating composition forms fewer (e.g., a smaller mass per mass of hydrogen formed) non-hydrogen materials as compared to a corresponding hydrogen-generating composition including less or none of the Lewis acid. The non-hydrogen materials that are formed less or not at all during hydrogen production can be hydrates (e.g., hydrated hydroxides) of the hydride in the hydrogen-generating composition. By avoiding production of unwanted (e.g., non-hydrogen) materials during hydrogen generation, the amount of hydrogen that can be produced per mass of the hydrogen-generating composition can be greater than that of a corresponding hydrogen-generating composition including less or none of the Lewis acid or less or none of the metal oxide.

In some embodiments, when contacted with water the hydrogen-generating composition forms hydrogen gas at a higher rate as compared to a corresponding hydrogen-generating composition including less or none of the Lewis acid. For example, a given mass of the hydrogen-generating composition can form a given number of moles of hydrogen gas in less time when contacted with a given mass of water as compared to the amount of time required for the same mass of a corresponding hydrogen-generating composition, including less or none or the Lewis acid or including less or none of the metal oxide, contacted with the same mass of water to produce the same number of moles of hydrogen gas. The rate of hydrogen generation of embodiments of the hydrogen-generating composition can exceed the rate of a corresponding hydrogen-generating composition including less or none or the Lewis acid or including less or none of the metal oxide by any suitable amount; for example, the rate can be greater than 1 times greater to equal to or less than about 20 times greater as compared to a corresponding hydrogen-generating composition including less or none of the Lewis acid, or about 2.5 to about 7.5 times greater, or about 2 times greater or less, or less than, equal to, or greater than about 2.5 times greater, 3, 3.5, 4, 4.5, 5, 5.5, 6, 6.5, 7, 7.5, 8, 9, 10, 11, 12, 13, 14, 15, 16, 18, or about 20 or more times greater.

In some embodiments, the hydrogen-generating composition is substantially free of elemental metals. In some embodiments, the hydrogen-generating composition can be substantially free of elemental aluminum.

Hydride.

The hydrogen-generating composition may include one or more hydrides. The one or more hydrides can form any suitable proportion of the hydrogen-generating composition, such as about 50 wt % to about 99.999 wt %, about 70 wt % to about 99.9 wt %, about 70 wt % to about 90 wt %, or about 50 wt % or less, or less than, equal to, or greater than about 52 wt %, 54, 56, 58, 60, 62, 64, 66, 68, 70, 71, 72, 73, 74, 75, 76, 77, 78, 79, 80, 81, 82, 83, 84, 85, 86, 87, 88, 89, 90, 92, 94, 96, 98, 99, 99.9, 99.99, or about 99.999 wt % or more.

The hydride can be any suitable hydride, such that the hydrogen-generating composition can be used as described herein. The hydride can be a compound in which one or more hydrogen centers (e.g., one or more hydrogen atoms, or a group that includes one or more hydrogen atoms) having nucleophilic, reducing, or basic properties. The hydrogen atom in the hydride can be bonded to a more electropositive element or group. For example, the hydrogen can be chosen from an ionic hydride (e.g., a hydrogen atom bound to an electropositive metal, such as an alkali metal or alkaline earth metal), a covalent hydride (e.g., compounds including covalently bonded hydrogen and that react as hydride, such that the hydrogen atom or hydrogen center has nucleophilic properties, reducing properties, basic properties, or a combination thereof), a metallic hydride (e.g., interstitial hydrides that exist within metals or alloys), a transition metal hydride complex (e.g., including compounds that can be classified as covalent hydrides or interstitial hydrides, such as including a single bond between the hydrogen atom and a transition metal), or a combination thereof.

The hydride can be chosen from magnesium hydride ($MgH_2$), lithium hydride (LiH), aluminum hydride ($AlH_3$), calcium hydride ($CaH_2$), sodium aluminum hydride ($NaAlH_4$), sodium borohydride ($NaBH_4$), lithium aluminum hydride ($LiAlH_4$), ammonia borane ($H_3NBH_3$), diborane ($B_2H_6$), palladium hydride, $LaNi_5H_6$, $TiFeH_2$, and a combination thereof. The hydride can be chosen from lithium aluminum hydride ($LiAlH_4$), calcium hydride ($CaH_2$), sodium aluminum hydride ($NaAlH_4$), aluminum hydride ($LiAlH_4$), and a combination thereof. The hydride can be lithium aluminum hydride ($LiAlH_4$).

In some embodiments, the hydrogen-generating composition only includes a single hydride and is substantially free of other hydrides. In some embodiments, the hydrogen-generating composition only includes one or more hydrides chosen from lithium aluminum hydride ($LiAlH_4$), calcium hydride ($CaH_2$), sodium aluminum hydride ($NaAlH_4$), and aluminum hydride ($AlH_3$), and is substantially free of other hydrides. In some embodiments, the hydrogen-generating composition only includes the hydride lithium aluminum hydride ($LiAlH_4$), and is substantially free of other hydrides. In some embodiments, the hydrogen-generating composition can be substantially free of simple hydrides that are a metal atom directly bound to a hydrogen atom. In some embodiments, the hydrogen-generating composition can be substantially free of lithium hydride and beryllium hydride.

In some embodiments, the hydrogen-generating composition can be substantially free of hydrides of aluminum (Al), arsenic (As), boron (B), barium (Ba), beryllium (Be), calcium (Ca), cadmium (Cd), cerium (CO, cesium (Cs), copper (Cu), europium (Eu), iron (Fe), gallium (Ga), gadolinium (Gd), germanium (Ge), hafnium (Hf), mercury (Hg), indium (in), potassium (K), lanthanum (La), lithium (Li), magnesium (Mg), manganese (Mn), sodium (Na), neodymium (Nd), nickel (Ni), lead (Pb), praseodymium (Pr), rubidium (Rb), antimony (Sb), scandium (Sc), selenium (Se), silicon (Si), samarium (Sm), tin (Sn), strontium (Sr), thorium (Th), titanium (Ti), thallium (Tl), vanadium (V), tungsten (W), yttrium (Y), ytterbium (Yb), zinc (Zn), zirconium (Zr), hydrides of organic cations including ($CH_3$) methyl groups, or a combination thereof. In various embodiments, the hydrogen-generating composition can be substantially free of one or more of lithium hydride (LiH), sodium hydride (NaH), potassium hydride (KH), magnesium hydride ($MgH_2$), calcium hydride ($CaH_2$), lithium aluminum hydride ($LiAlH_4$), sodium borohydride ($NaBH_4$), lithium borohydride ($LiBH_4$), magnesium borohydride $Mg(BH_4)_2$, sodium aluminum hydride ($NaAlH_4$), or mixtures thereof.

In some embodiments, the hydrogen-generating composition includes a metal hydride (e.g., an interstitial intermetallic hydride). Metal hydrides can reversibly absorb hydrogen into their metal lattice. The metal hydride can be any suitable metal hydride. The metal hydride can be $LaNi_5$, $LaNi_{4.6}Mn_{0.4}$, $MnNi_{3.5}Co_{0.7}Al_{0.8}$, $MnNi_{4.2}Co_{0.2}Mn_{0.3}Al_{0.3}$, $TiFe_{0.8}Ni_{0.2}$, $CaNi_5$, $(V_{0.9}Ti_{0.1})_{0.95}Fe_{0.05}$, $(V_{0.9}Ti_{0.1})_{0.95}Fe_{0.05}$, $LaNi_{4.7}Al_{0.3}$, $LaNi_{5-x}Al_x$ wherein x is about 0 to about 1, or any combination thereof. The metal hydride can be $LaNi_{5-x}Al_x$ wherein x is about 0 to about 1 (e.g., from $LaNi_5$ to $LaNi_4Al$). The metal hydride can form any suitable proportion of the hydrogen-generating composition, such as about 10 wt % to about 99.999 wt %, or about 20 wt % to about 99.5 wt %, or about 10 wt % or less, or less than, equal to, or greater than about 15 wt %, 20, 21, 22, 23, 24, 25, 26, 27, 28, 29, 30, 35, 40, 45, 50, 55, 60, 65, 70, 75, 80, 85, 90, 91, 92, 93, 94, 95, 96, 97, 98, 99, 99.5, 99.9, 99.99, or about 99.999 wt % or more. Any metal hydride that is described in U.S. Pat. No. 8,172,928, incorporated by reference herein in its entirety, can be included in the present hydrogen-generating composition.

The hydrogen-generating composition can include both a metal hydride (e.g., an interstitial intermetallic hydride, such as $LaNi_{5-x}Al_x$ wherein x is about 0 to about 1), and a chemical hydride (e.g., an ionic hydride or a covalent hydride, such as magnesium hydride ($MgH_2$), lithium hydride (LiH), aluminum hydride ($AlH_3$), calcium hydride ($CaH_2$), sodium aluminum hydride ($NaAlH_4$), sodium borohydride ($NaBH_4$), lithium aluminum hydride ($LiAlH_4$), ammonia borane ($H_3NBH_3$), diborane ($B_2H_6$), palladium hydride, $LaNi_5H_6$, $TiFeH_2$, and a combination thereof). In some embodiments, the hydrogen-generating composition can include a uniform blend of the chemical hydride, the metal hydride, and the Lewis acid. In some embodiments, the hydrogen-generating composition can include the metal hydride separate from a mixture of the chemical hydride and the Lewis acid, such as a fuel pellet including a metal hydride and a different fuel pellet including an intimate mixture of a chemical hydride and a Lewis acid.

A hydrogen-generating composition including a chemical hydride, a metal hydride, and a Lewis acid can include any suitable proportion of the chemical hydride, such as about 0.5 wt % to about 65 wt %, or about 0.5 wt % or less, or less than, equal to, or greater than about 1 wt %, 2, 3, 4, 5, 10, 15, 20, 25, 30, 35, 40, 45, 50, 55, 60, or about 65 wt % or more. A hydrogen-generating composition including a chemical hydride, a metal hydride, and a Lewis acid can include any suitable proportion of the metal hydride, such as about 20 wt % to about 99.5 wt %, or about 20 wt % or less, or less than, equal to, or greater than about 25 wt %, 30, 35, 40, 45, 50, 55, 60, 65, 70, 75, 80, 85, 90, 95, 96, 97, 98, 99, or about 99.5 wt % or more. A hydrogen-generating composition including a chemical hydride, a metal hydride, and a Lewis acid can include any suitable proportion of the Lewis acid, such as about 0.1 wt % to about 20 wt %, or about 0.1 wt % or less, or less than, equal to, or greater than about 0.5 wt %, 1, 2, 3, 4, 5, 6, 8, 10, 12, 14, 16, 18, or about 20 wt % or more. In one example, a hydrogen-generating composition includes 5 vol % $LaNi_{5-x}Al_x$ wherein x is about 0 to about 1, and is about 60.9 wt % $LaAlH_4$, about 15.2 wt % $ZrCl_4$, and about 23.8 wt % $LaNi_{5-x}Al_x$. In another example, the hydrogen-generating composition includes 95 vol % $LaNi_{5-x}Al_x$ wherein x is about 0 to about 1, and is about 0.7 wt % $LiAlH_4$, about 0.2 wt % $ZrCl_4$, and about 99.1 wt % $LaNi_{5-x}Al_x$.

Lewis Acid.

The hydrogen-generating composition includes one or more Lewis acids. The one or more Lewis acids can form any suitable proportion of the hydrogen-generating composition, such as about 0.001 wt % to about 50 wt % of the hydrogen-generating composition, about 0.1 wt % to about 30 wt %, about 10 wt % to about 30 wt %, about 0.001 wt % or less, or less than, equal to, or greater than about 0.01 wt %, 0.1, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 32, 34, 36, 38, 40, 42, 44, 46, 48, or about 50 wt % or more.

The Lewis acid can be any suitable Lewis acid, such that the hydrogen-generating composition can be used as described herein. The Lewis acid can be an inorganic compound or an organometallic compound in which a cation of the Lewis acid is selected from the group consisting of scandium, titanium, vanadium, chromium, manganese, iron, cobalt, copper, zinc, boron, aluminum, yttrium, zirconium, niobium, molybdenum, cadmium, rhenium, lanthanum, erbium, ytterbium, samarium, tantalum, and tin. The anion of the Lewis acid can be a halide. The Lewis acid can be chosen from aluminum chloride ($AlCl_3$), aluminum bromide ($AlBr_3$), aluminum fluoride ($AlF_3$), stannous (II) chloride ($SnCl_2$), stannous (II) bromide ($SnBr_2$), stannous (II) fluoride ($SnF_2$), magnesium chloride ($MgCl_2$), magnesium bromide ($MgBr_2$), magnesium fluoride ($MgF_2$), zirconium (IV) chloride ($ZrCl_4$), zirconium (IV) bromide ($ZrBr_4$), zirconium (IV) fluoride ($ZrF_4$), tungsten (VI) chloride ($WCl_6$), tungsten (VI) bromide ($WBr_6$), tungsten (VI) fluoride ($WF_6$), zinc chloride ($ZnCl_2$), zinc bromide ($ZnBr_2$), zinc fluoride ($ZnF_2$), ferric (III) chloride ($FeCl_3$), ferric (III) bromide ($FeBr_3$), ferric (III) fluoride ($FeF_3$), vanadium (III) chloride, vanadium (III) bromide, vanadium (III) fluoride, and a combination thereof. The Lewis acid can be chosen from aluminum chloride ($AlCl_3$), magnesium chloride ($MgCl_2$), zirconium (IV) chloride ($ZrCl_4$), and a combination thereof. The Lewis acid can be zirconium (IV) chloride ($ZrCl_4$).

Metal Oxide.

In various embodiments, the hydrogen-generating composition can include one or more metal oxides. In some embodiments, the hydrogen-generating composition can be free of metal oxides. The one or more metal oxides can form any suitable proportion of the hydrogen-generating composition, such as about 0.001 wt % to about 20 wt % of the hydrogen-generating composition, about 1 wt % to about 10 wt %, or about 0.001 wt % or less, or less than, equal to, or greater than about 0.01, 0.1, 1, 2, 3, 4, 5, 6, 7, 8, 9, 10, 12, 14, 16, 18, or about 20 wt % or more.

The metal oxide can be any suitable metal oxide, such that the hydrogen-generating composition can be used as described herein. The metal oxide can be zirconium (IV) oxide, hafnium (IV) oxide, titanium (IV) oxide, or a combination thereof. The metal oxide can be titanium (IV) oxide.

The hydrogen-consuming fuel cell can include an anode, a cathode, and an electrically-insulating ion-conducting electrolyte (e.g., a membrane, such as a proton exchange membrane, or PEM) separating the anode and cathode, wherein at least one of the anode or cathode undergoes a chemical reaction that consumes hydrogen and generates an electrical potential across the electrodes. In some embodiments, the cathode of the fuel cell consumes hydrogen gas and generates electrons and hydrogen ions. The hydrogen ions can travel across the electrolyte to the cathode, while the electrons can travel to the cathode via an electrical circuit connecting the anode to the cathode. At the cathode, the hydrogen ions can react with oxygen gas and the electrons produced by the anode to form water.

The water vapor reacts with the chemical hydride fuel in the hydrogen generator, and generates hydrogen in an exothermic reaction. The hydrogen is carried to a PEM fuel cell as illustrated in FIG. 1 to generate electrical power. Rather than deadending the hydrogen path, the hydrogen path continues along the PEM fuel cell and recirculates hydrogen back through the hydrogen generator. The hydrogen generator 100 interfaces with a fuel cell system, and may be contained in a replaceable and disposable (recyclable) cartridge such as a container. These cartridges may provide a low-cost source of energy having a dramatic improvement in energy versus prior batteries and fuel cell systems in part, because the fuel cell system is retained, while only the cartridge is replaced. The power generator 100 may be cylindrical in geometry in one embodiment.

Figure 2:
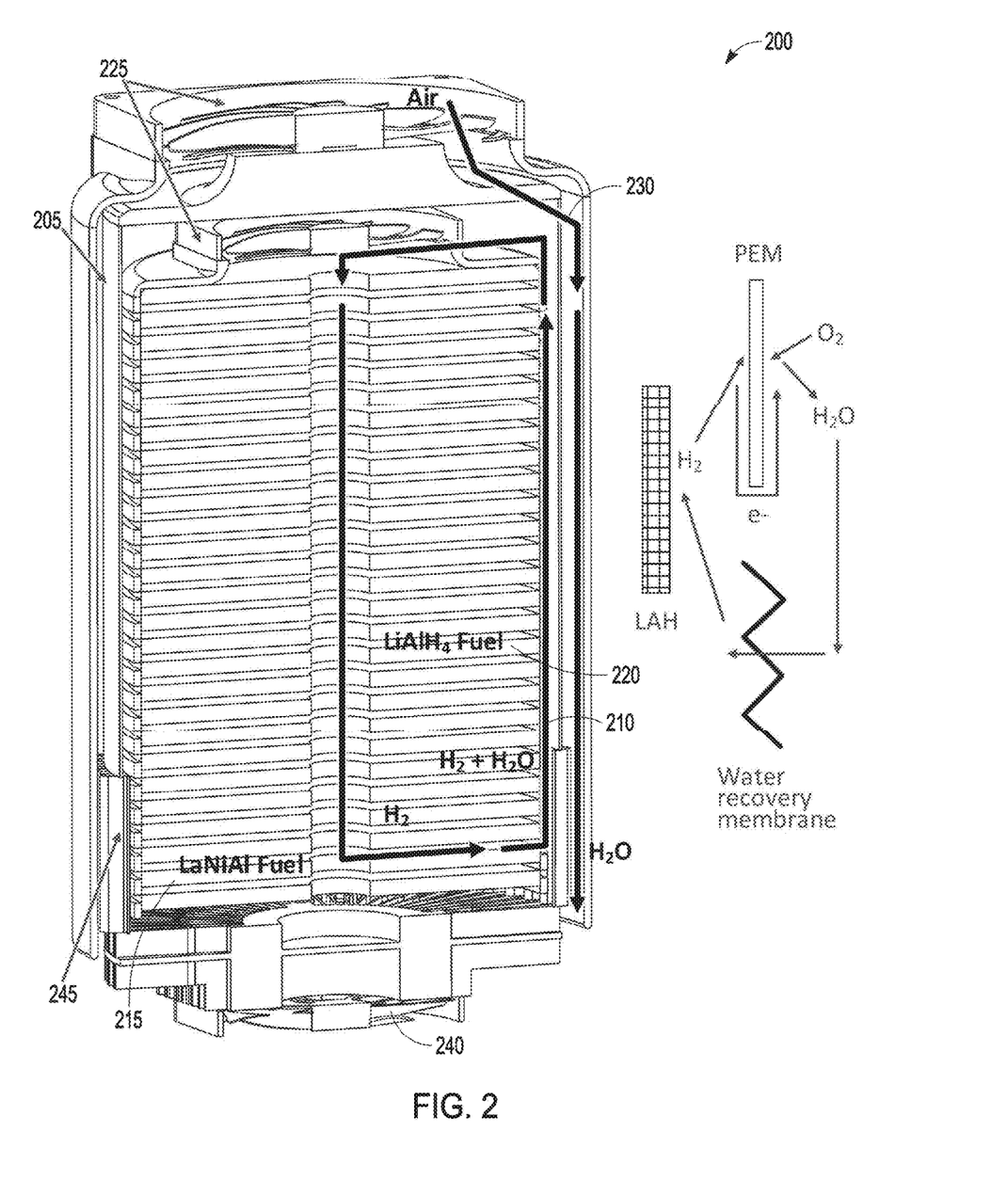
FIG. 2 is a conceptual cross section of a power generator utilizing the recirculating hydrogen path according to an example embodiment.

FIG. 2 is a conceptual cross section of a power generator 200 utilizing a PEM 205 and a recirculating hydrogen path 210 as previously illustrated in schematic form in FIG. 1. The hydrogen fuel includes both a metal hydride, LaNiAl as indicated at 215, and a chemical hydride, LiAlH$_4$ as indicated at 220. The fuel may include one or more different hydrogen producing fuels as described above.

Circulation fans are shown at 225 and are used to control the temperature of various elements to corresponding element set points. An ambient airpath is shown at 230. A cooling fan is shown at 240 at the bottom of the generator 200. A fuel cell and water recovery membrane is wrapped around a perimeter of the power generator, which may be in the form of a cartridge in some embodiments. In one embodiment, a fuel cell/water recovery membrane 245 is wrapped around a perimeter of the fuel cartridge. A fan in the ambient airpath 230 transfers water to the water recovery membrane and also cools the fuel. A fan in the hydrogen path provides hydrogen to the fuel cell, transfers water from the water recovery membrane to the fuel and cools the fuel. These fans are shown in FIG. 1. Cooling fan 240 on the bottom of the fuel cartridge may also control the temperature of the hydrogen generator.

Figure 3:
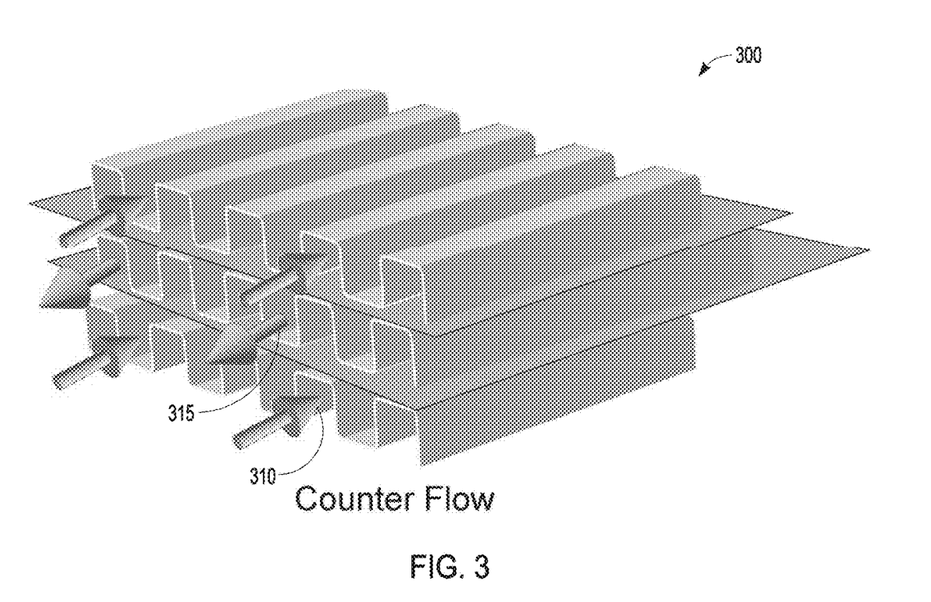
FIG. 3 is a perspective view of a water exchanger for power generator illustrating example water exchanger operating principles according to an example embodiment.

In various embodiments, the fuel cell based power generator may implemented in various micro fuel cell form factors with improved performance vs. lithium batteries that may be 3-5× smaller, 5-10× lighter, and highly scalable form factor, energy, and electrical characteristics. Fuel cell performance advantages may scale to kW power levels, ideal for UAS, UGV, UUV applications. In one embodiment, the use of a fuel cell based power generator may enables 8-12 hr flight times in a UAS vs. 50 minutes for Li-ion, which may be 10-12× longer than Li-ion batteries, resulting in a virtually silent, long endurance ISR platform with outstanding capability and stability FIG. 3 is a perspective view of a water exchanger 300 for power generator illustrating example water exchanger operating principles according to an example embodiment. The water exchanger consists of a number of tubes or channels 310 with flow in one direction adjacent channels 315 with flow in an opposite direction. The channels may be formed as layers with walls that stack and allow transfer of water vapor between them. Water molecules may be absorbed into walls of Nafion® tubes and transferred to a dry gas steam. The transfer process may be driven by a difference in partial pressure of water vapor on opposing sides.

Figure 4:
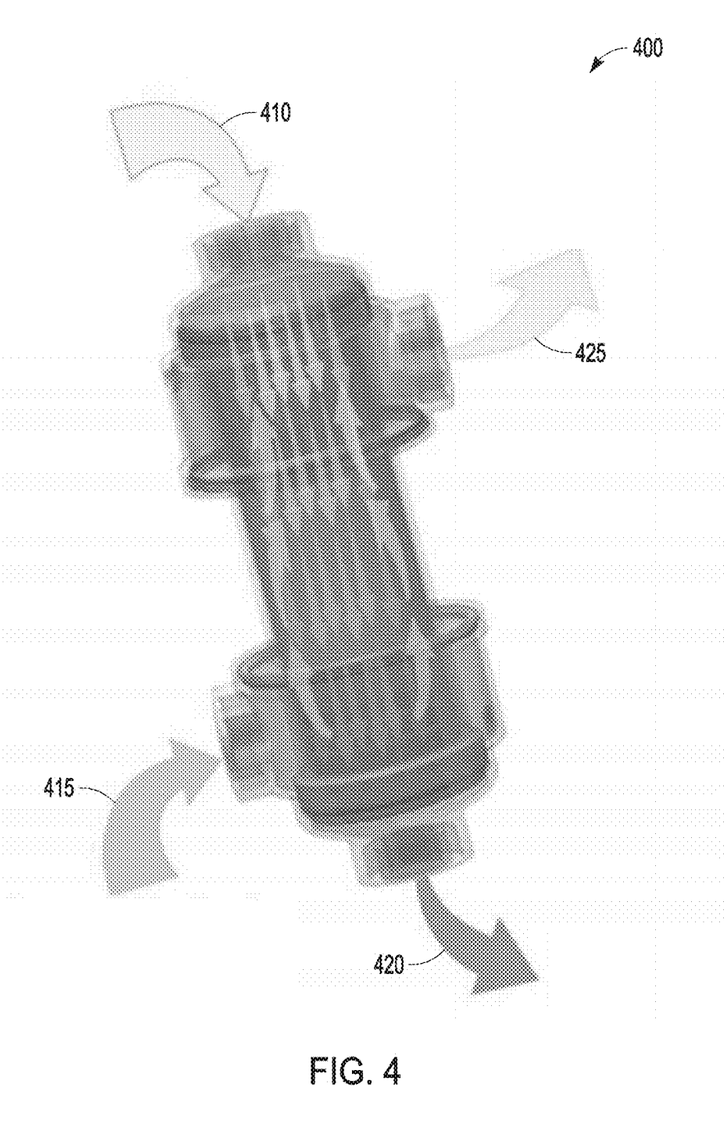
FIG. 4 is perspective cut-away view of an example water exchanger according to an example embodiment.

FIG. 4 is perspective cut-away view of an example water exchanger 400 according to an example embodiment. Water exchanger 400 is illustrated with a dry hydrogen inlet 410 and wet hydrogen outlet 420, corresponding to the anode stream, and humid air inlet 415 and dry air outlet 425, corresponding to the cathode stream. Water is transferred from the cathode stream to the anode stream in the water exchanger. In one embodiment, an FC™-series humidifier may be used for water exchanger 155.

Figure 5:
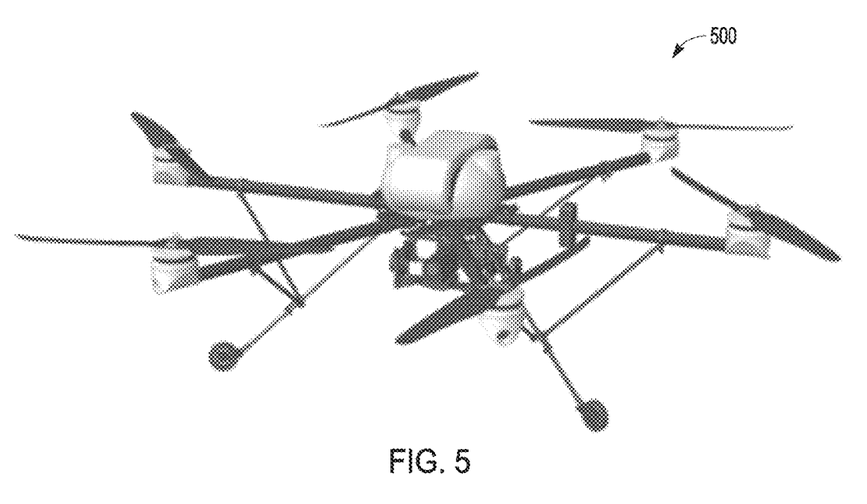
FIG. 5 is a perspective view of an unmanned air system (UAS) utilizing the power generator according to example embodiments.

FIG. 5 is a perspective view of an unmanned air system (UAS) 500 utilizing the power generator according to example embodiments. The fuel cell based power generator may be adapted to fulfill published requirements for long endurance VTOL ISR system operation. Two example design points include projected fuel cell performance for two designs: 1200 W power, 8 kWh energy and 1200 W power, 12 kWh energy.

Figure 6:
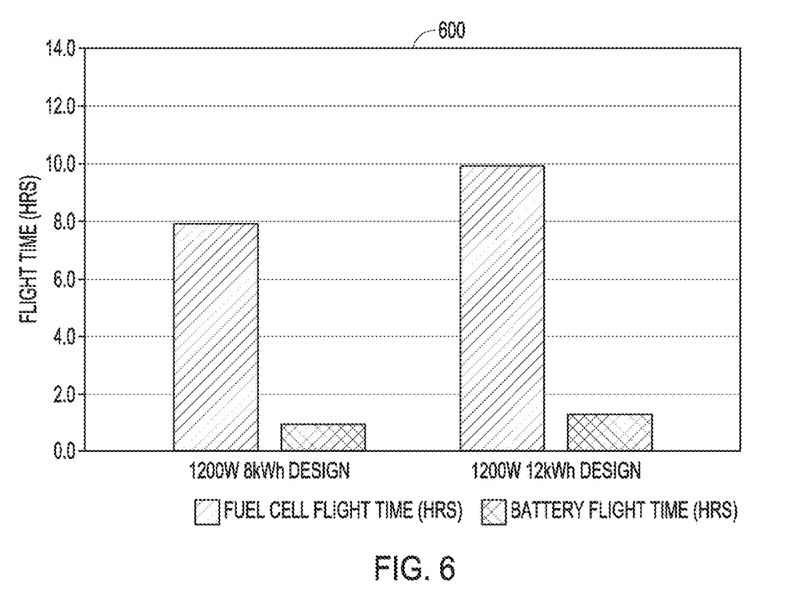
FIG. 6 is a chart illustrating fuel cell based power generator performance compared to an Li-Ion battery according to an example embodiment.

FIG. 6 is a chart illustrating fuel cell based power generator performance at 600 compared to an Li-Ion battery according to an example embodiment. Fuel cell performance compares favorably to Li-ion, providing 8-12 hrs of projected runtime in a UAS, vs. ~50 minutes for Li-ion. Fuel cell provides ~10-12× the flight time of Li-ion.

Figure 7:
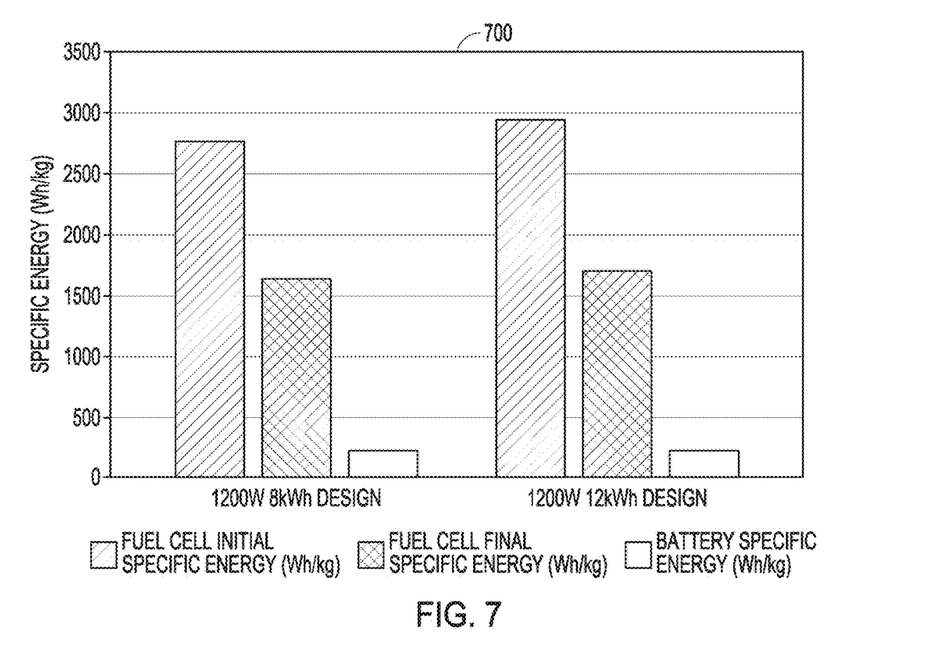
FIG. 7 is chart illustrating fuel cell based power generator specific energy decrease during discharge due to oxygen accumulation in reaction products according to an example embodiment.

FIG. 7 is chart 700 illustrating fuel cell based power generator specific energy decrease during discharge due to oxygen accumulation in reaction products according to an example embodiment. Fuel cell specific energy decreases during discharge due to oxygen accumulation in reaction products. Initial (beginning of life) values range from ~2500-3000 Wh/kg, for the two designs. Final (end of life) values range from ~1500-1650 Whr/kg, for the two designs. Battery specific energy constant at ~220 Wh/kg. Fuel cell variable mass (and resulting power consumption) is accounted for in analysis.

Figure 8:
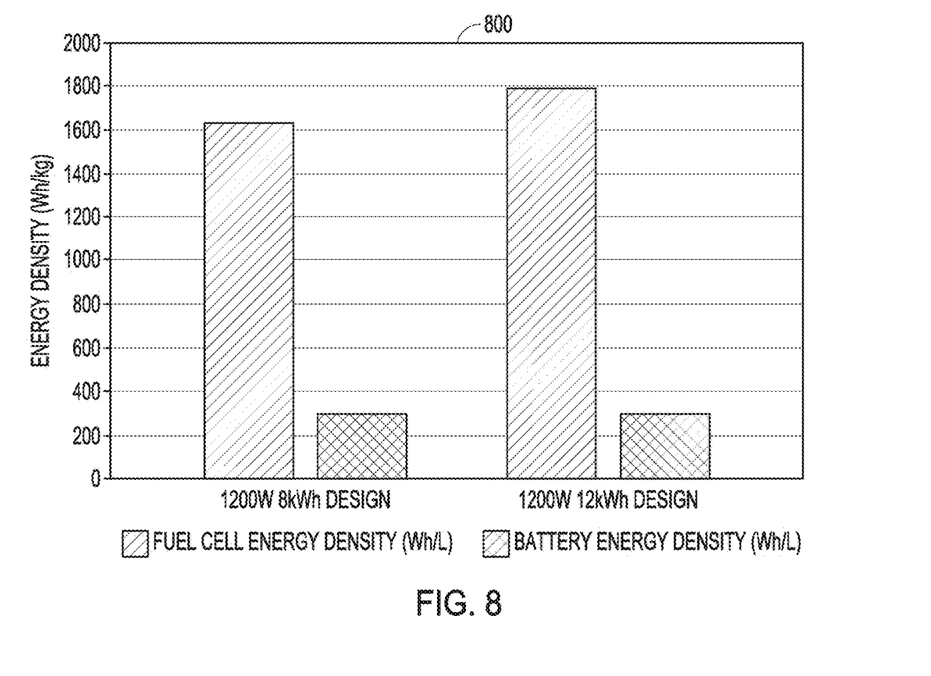
FIG. 8 is chart illustrating energy density differences between two alternative kWh fuel cell designs and a Li-Ion battery according to example embodiments.

FIG. 8 is chart 800 illustrating energy density differences between two alternative kWh fuel cell designs and a Li-Ion battery according to example embodiments.

Figure 9:
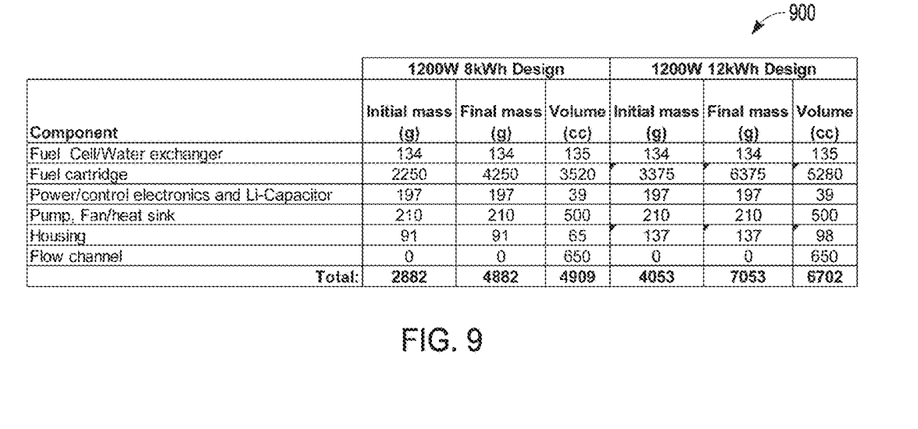
FIG. 9 is a chart illustrating characteristics of the two fuel cell designs of FIG. 9

FIG. 9 is a chart 900 illustrating characteristics of the two fuel cell designs of FIG. 8.

Fuel cell energy density ranges from 1400-1800 Wh/L for the two designs, compared to ~300 Wh/L for Li-ion. Fuel cell energy density may be 4-6× Li-ion.

Figure 10:
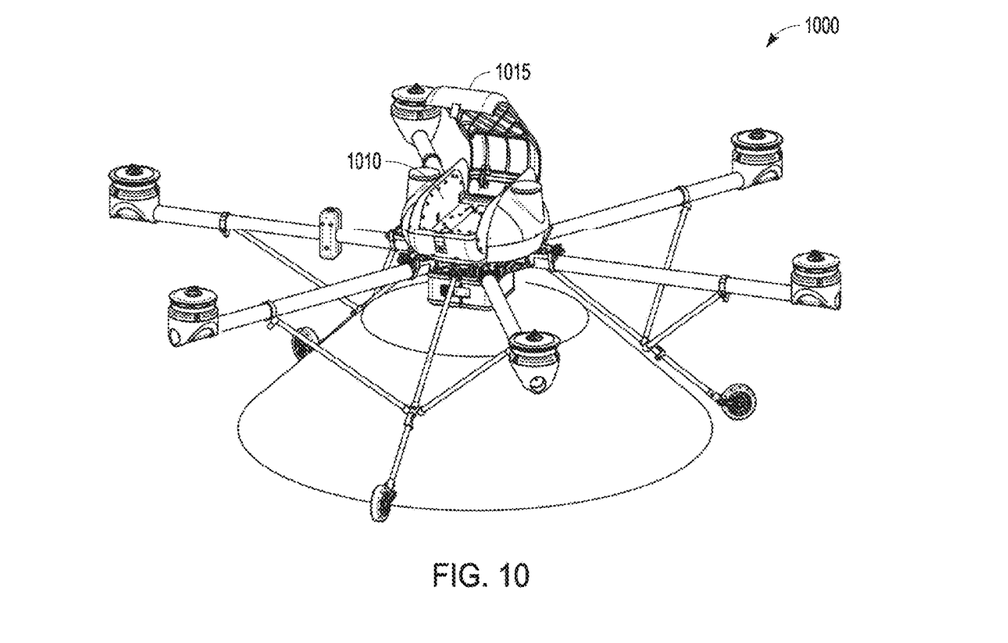
FIG. 10 is a perspective view of a UAS illustrating an open battery compartment according to an example embodiment.

FIG. 10 is a perspective view of a UAS 1000 illustrating an open battery compartment 1010 according to an example embodiment. A hinged cover 1015 is show open. In one embodiment, the compartment 1010 provides space and cooling for fuel cell integration. The fuel cell based power generator will provide power resulting in a virtually silent long endurance ISR platform with outstanding capability and stability. The use of the hybrid power generator with batteries charged from the fuel cell will provide rates of electrical power suitable for the above functions. Multiple functions combined with long endurance provides maximum operational value and flexibility.

Figure 11:
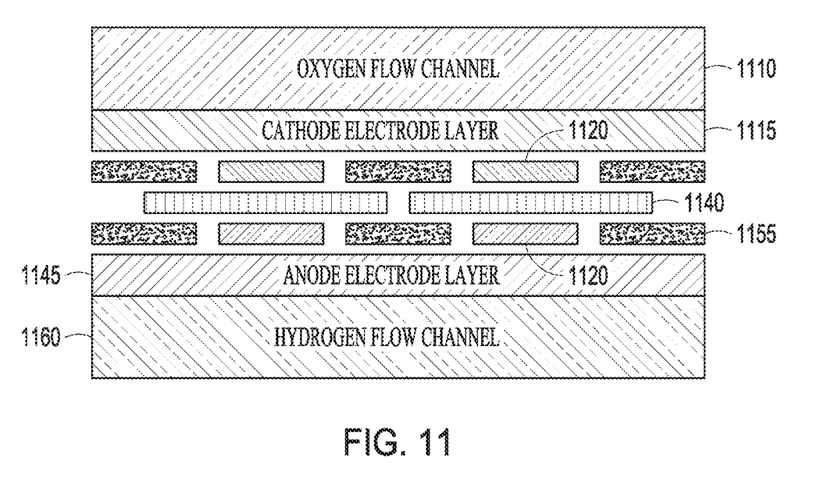
FIG. 11 is a block cross section diagram illustrating selected layers of a fuel cell stack is a cross section diagram of a hydrogen fuel cell based power generator according to an example embodiment.

FIG. 11 is a block cross section diagram illustrating selected layers of an example fuel cell stack. Note that this is just one example of a fuel cell stack and that other fuel cell stacks may be utilized in further embodiments. Starting to the top of the selected layers and oxygen flow channel 1110 is shown. A cathode electrode 1115 is adjacent the flow channel 1110, followed by a gas diffusion layer 1120 adapted to correspond to each of the cells, with an adhesive layer 1130. A membrane electrode assembly layer 1140 is then disposed to receive oxygen from the flow channel 1110, which is porous, and through the gas diffusion layer 1130 on a first side. Hydrogen from a hydrogen flow channel 1145 on the other side of the membrane electrode assembly layer 1140 passes through an anode electrode layer 1145, and gas diffusion layer 1150 adhered between the membrane electrode assembly layer 1140 and gas diffusion layer 1150 by an adhesive layer 1155. The hydrogen and oxygen react at the membrane electrode assembly layer 1140 to produce electricity, which is conducted by the anode and cathode electrode layers. The layers between the flow channels are flipped and repeated between succeeding flow channels that alternate between hydrogen and oxygen flow channels.

Figure 12:
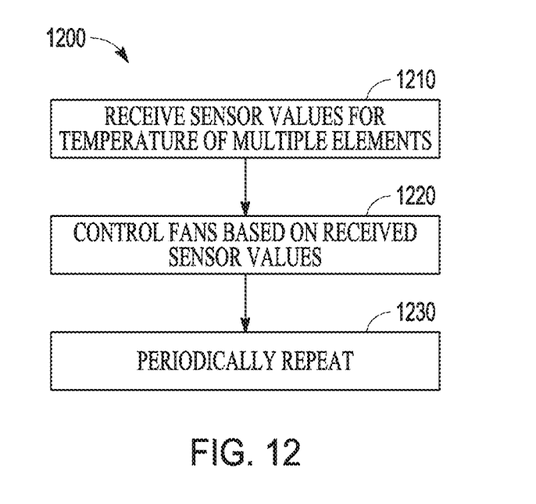
FIG. 12 is a flowchart illustrating a method of controlling the temperature of multiple elements of a fuel cell based power generator according to an example embodiment.

FIG. 12 is a flow diagram 1200 illustrating control of temperatures of elements of the hydrogen PEM fuel cell based power generator according to an example embodiment. In one embodiment, the power management circuitry

135, also referred to as a controller, executes functions to control fan speeds and hence temperature of selected elements as described above.

At 1210, the controller obtains data from numerous sensors regarding the temperature of various element and/or gas or fluid at selected portions of the hydrogen and ambient air paths. At 1220, the signals are generated to control fans based on the received sensor values to control the temperatures of the elements to their corresponding set points. As mentioned, the control algorithm may be based on standard PID type control algorithms which may involve one or more or proportion, integral, and derivative control. If the temperature of the fuel cell stack is high, the ambient air path fan speed can be increased to help cool the fuel cell stack. At 1230, the controller periodically repeats method 1200. If programmable digital control is used, periodically means simple repeating the method in succession. If analog control is used, periodical may mean continuous control.

Figure 13:
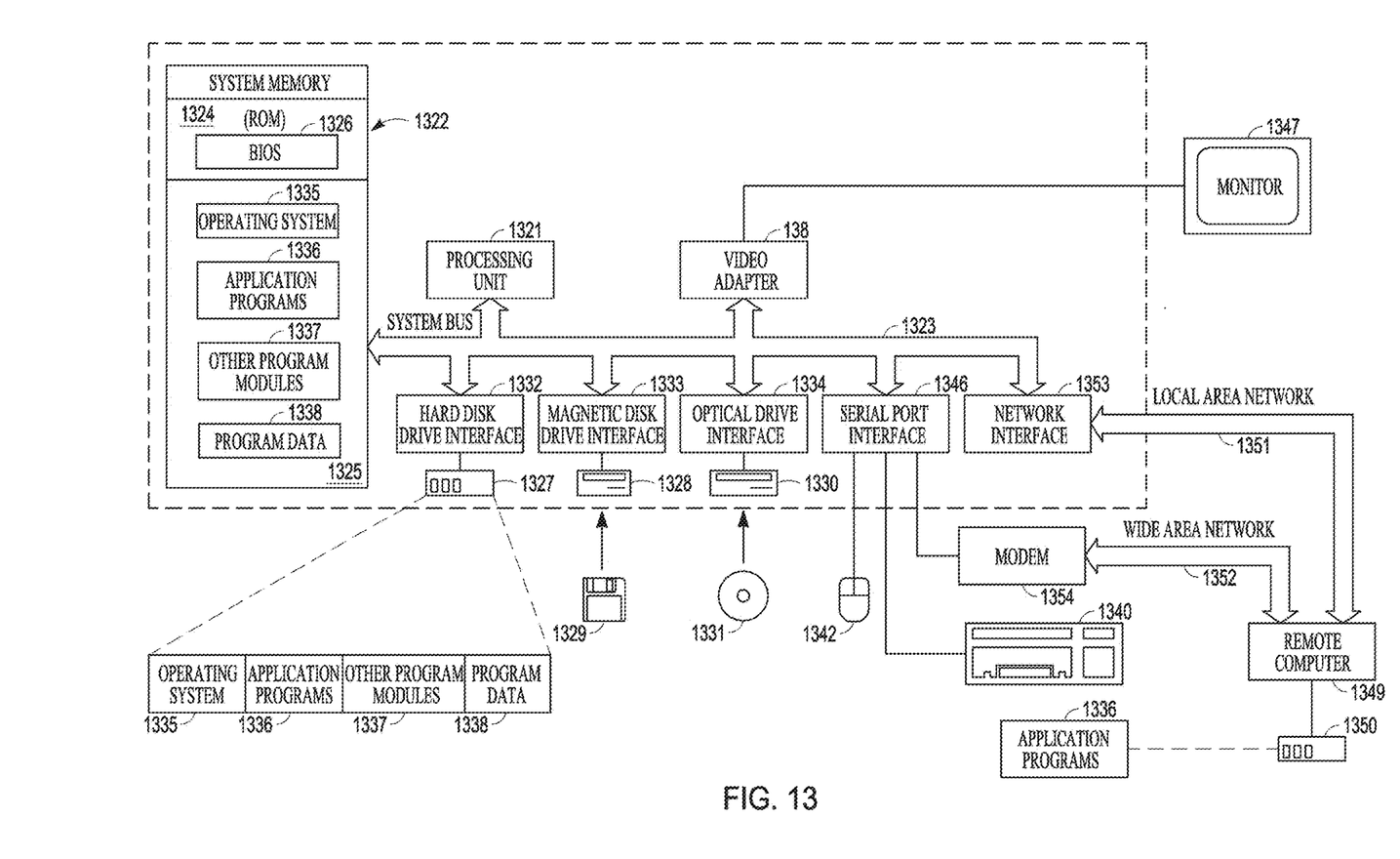
FIG. 13 is a block diagram of a specifically programmed circuitry or processor for executing control methods for a hydrogen fuel cell based power generator according to an example embodiment.

FIG. 13 is a block diagram of a specifically programmed system for executing control methods for a hydrogen fuel cell based power generator according to an example embodiment. One embodiment of hardware and operating environment of the system includes a general purpose computing device in the form of a computer 1300 (e.g., a personal computer, workstation, or server), including one or more processing units 1321, a system memory 1322, and a system bus 1323 that operatively couples various system components including the system memory 1322 to the processing unit 1321. There may be only one or there may be more than one processing unit 1321, such that the processor of computer 1300 comprises a single central-processing unit (CPU), or a plurality of processing units, commonly referred to as a multiprocessor or parallel-processor environment. In various embodiments, computer 1300 is a conventional computer, a distributed computer, or any other type of computer.

The system bus 1323 can be any of several types of bus structures including a memory bus or memory controller, a peripheral bus, and a local bus using any of a variety of bus architectures. The system memory can also be referred to as simply the memory, and, in some embodiments, includes read-only memory (ROM) 1324 and random-access memory (RAM) 1325. A basic input/output system (BIOS) program 1326, containing the basic routines that help to transfer information between elements within the computer 1300, such as during start-up, may be stored in ROM 1324. The computer 1300 further includes a hard disk drive 1327 for reading from and writing to a hard disk, not shown, a magnetic disk drive 1328 for reading from or writing to a removable magnetic disk 1329, and an optical disk drive 1330 for reading from or writing to a removable optical disk 1331 such as a CD ROM or other optical media.

The hard disk drive 1327, magnetic disk drive 1328, and optical disk drive 1330 couple with a hard disk drive interface 1332, a magnetic disk drive interface 1333, and an optical disk drive interface 1334, respectively. The drives and their associated computer-readable media provide non volatile storage of computer-readable instructions, data structures, program modules and other data for the computer 1300. It should be appreciated by those skilled in the art that any type of computer-readable media which can store data that is accessible by a computer, such as magnetic cassettes, flash memory cards, digital video disks, Bernoulli cartridges, random access memories (RAMS), read only memories (ROMs), redundant arrays of independent disks (e.g., RAID storage devices) and the like, can be used in the exemplary operating environment.

A plurality of program modules can be stored on the hard disk, magnetic disk 1329, optical disk 1331, ROM 1324, or RAM 1325, including an operating system 1335, one or more application programs 1336, other program modules 1337, and program data 1338. Programming for implementing one or more processes or method described herein may be resident on any one or number of these computer-readable media.

A user may enter commands and information into computer 1300 through input devices such as a keyboard 1340 and pointing device 1342. Other input devices (not shown) can include a microphone, joystick, game pad, satellite dish, scanner, or the like. These other input devices are often connected to the processing unit 1321 through a serial port interface 1346 that is coupled to the system bus 1323, but can be connected by other interfaces, such as a parallel port, game port, or a universal serial bus (USB). A monitor 1347 or other type of display device can also be connected to the system bus 1323 via an interface, such as a video adapter 1348. The monitor 1347 can display a graphical user interface for the user. In addition to the monitor 1347, computers typically include other peripheral output devices (not shown), such as speakers and printers.

The computer 1300 may operate in a networked environment using logical connections to one or more remote computers or servers, such as remote computer 1349. These logical connections are achieved by a communication device coupled to or a part of the computer 1300; the invention is not limited to a particular type of communications device. The remote computer 1349 can be another computer, a server, a router, a network PC, a client, a peer device or other common network node, and typically includes many or all of the elements described above I/O relative to the computer 1300, although only a memory storage device 1350 has been illustrated. The logical connections depicted in FIG. 13 include a local area network (LAN) 1351 and/or a wide area network (WAN) 1352. Such networking environments are commonplace in office networks, enterprise-wide computer networks, intranets and the internet, which are all types of networks.

When used in a LAN-networking environment, the computer 1300 is connected to the LAN 1351 through a network interface or adapter 1353, which is one type of communications device. In some embodiments, when used in a WAN-networking environment, the computer 1300 typically includes a modem 1354 (another type of communications device) or any other type of communications device, e.g., a wireless transceiver, for establishing communications over the wide-area network 1352, such as the internet. The modem 1354, which may be internal or external, is connected to the system bus 1323 via the serial port interface 1346. In a networked environment, program modules depicted relative to the computer 1300 can be stored in the remote memory storage device 1350 of remote computer, or server 1349. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

In further embodiments, power management and control electronics includes temperature and power output sensors that are used by the control electronics to control the pump/fan speed to maintain ideal temperatures and power output. The control electronics may be configured to maintain design points for such temperatures and power output, or may utilize one or more equations that are parameterized based on empirical data obtained from operation of a nominal PEM fuel cell based power generator.

In one embodiment, the fuel cells charge the Li-ion battery or batteries, which serve to provide power to a load, such as the UAS. The batteries provide the ability to supply higher and more dynamic levels of power than simply utilizing the the fuel cells directly, which can be slower to respond and not normally be able to provide high levels of current that may be required for operation of the UAS in a desired manner, such as accelerating sufficiently while carrying a load.

EXAMPLES

1. In example 1, a fuel cell based power generator including a fuel cell element, a water exchanger element, a hydrogen generator element, an ambient air path configured to receive ambient air and provide the ambient air across a cathode side of the fuel cell element, receive water from the fuel cell element and provide wet air to the water exchanger element, and a recirculating hydrogen air path configured to receive hydrogen from the hydrogen generator element, provide the hydrogen past an anode side the fuel cell element to the water exchanger element and provide wet hydrogen back to the hydrogen generator.

2. The fuel cell based power generator of example 1 and further comprising a rechargeable battery coupled to the fuel cell element to receive electricity from the fuel cell element and provide electricity to a load.

3. The fuel cell based power generator of any of examples 1-2 and further including a fuel cell temperature sensor positioned to sense a temperature of the fuel cell element, and an ambient air path fan controller to receive temperature information from the fuel cell element temperature sensor and control the ambient air path fan speed to maintain the fuel cell element temperature at a selected temperature.

4. The fuel cell based power generator of example 3 wherein the fuel cell element selected temperature is 60° C.

5. The fuel cell based power generator of example 3 wherein the fuel cell element selected temperature is between 60° C. and 80° C.

6. The fuel cell based power generator of any of examples 1-5 and further including a hydrogen generator element temperature sensor positioned to sense a temperature of the hydrogen generator element; and, a recirculating hydrogen air path fan controller to receive temperature information from the hydrogen generator element temperature sensor and control the recirculating hydrogen air path fan speed to maintain the hydrogen generator element temperature at a selected temperature.

7. The fuel cell based power generator of example 6 wherein the hydrogen generator element selected temperature is 80° C.

8. The fuel cell based power generator of example 6 wherein the hydrogen generator element selected temperature is between 60° C.-100° C.

9. The fuel cell based power generator of any of examples 1-8 and further including a water exchanger element temperature sensor positioned to sense a temperature of the water exchanger element, a recirculating hydrogen air path heat exchanger with fan disposed in the hydrogen path coupled to the water exchanger element, an ambient air path water heat exchanger element with fan disposed in the ambient air path coupled to the water exchanger element and a fan controller to receive temperature information from the water exchanger element temperature sensor and control heat exchanger fan speeds to maintain the water exchanger element temperature at a water exchanger selected temperature.

10. The fuel cell based power generator of example 9 wherein the water exchanger element selected temperature is 40° C.

11. The fuel cell based power generator of example 9 wherein the water exchanger element selected temperature is between 40° C.-60° C.

12. The fuel cell based power generator of any of examples 1-11 wherein the water exchanger element is coupled to receive warm wet air from the ambient air path, warm dry hydrogen from the recirculating hydrogen air path, exhaust hot dry air to ambient, and provide wet hydrogen to the hydrogen generator element via the recirculating hydrogen air path.

13. In example 13, a method includes passing ambient air via an ambient air path past a cathode side of the fuel cell to a water exchanger, picking up water from the cathode side of the fuel cell and exhausting air and nitrogen to ambient, passing hydrogen via a recirculating hydrogen path past an anode side the fuel cell to the water exchanger, where the water exchanger transfers water from the ambient air path comprising a cathode stream to the recirculating hydrogen path comprising an anode stream, and passing the water to a hydrogen generator to add hydrogen to the recirculating hydrogen path and passing the hydrogen via the recirculating hydrogen path past the anode side of the fuel cell.

14. The method of example 13 and further including sensing a temperature of the fuel cell and controlling airspeed in the ambient air path to maintain the fuel cell at a fuel cell set point temperature.

15. The method of example 14 wherein the fuel cell set point temperature is 60° C.

16. The method of example 14 wherein the fuel cell set point temperature is between 60° C. and 80° C.

17. The method of any of examples 13-16 and further including sensing a temperature of the hydrogen generator and controlling airspeed in the recirculating hydrogen air path to maintain the hydrogen generator at a hydrogen generator set point temperature.

18. The method of example 17 wherein the hydrogen generator set point temperature is 80° C.

19. The method of example 17 wherein the fuel cell set point temperature is between 60° C. and 100° C.

20. The method of any of examples 13-19 and further including sensing a temperature of the water exchanger and controlling fans of heat exchangers in the recirculating hydrogen path and ambient air path to maintain the water exchanger temperature at a water exchanger set point temperature.

21. The method of example 20 wherein the water exchanger set point temperature is 40° C.

22. The method of example 20 wherein the water exchanger set point temperature is between 40° C. and 60° C. Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A fuel cell based power generator comprising:
a fuel cell element;
a water exchanger element;
a hydrogen generator element directly connected to the water exchanger element;
an ambient air path configured to receive ambient air and provide the ambient air across a cathode side of the fuel cell element, receive water from the fuel cell element and provide wet air to the water exchanger element;
a recirculating hydrogen air path configured to receive hydrogen from the hydrogen generator element, provide the hydrogen past an anode side the fuel cell element to the water exchanger element and provide wet hydrogen back to the hydrogen generator; and
a recirculating hydrogen air path heat exchanger with fan disposed in the recirculating hydrogen air path after the hydrogen generator element and before the fuel cell element.

2. The fuel cell based power generator of claim 1 and further comprising a rechargeable battery coupled to the fuel cell element to receive electricity from the fuel cell element and provide electricity to a load.

3. The fuel cell based power generator of claim 1 and further comprising:
a fuel cell temperature sensor positioned to sense a temperature of the fuel cell element; and
an ambient air path fan controller to receive temperature information from the fuel cell element temperature sensor and control the ambient air path fan speed to maintain the fuel cell element temperature at a selected temperature.

4. The fuel cell based power generator of claim 3 wherein the fuel cell element selected temperature is 60° C.

5. The fuel cell based power generator f claim 3 wherein the fuel cell element selected temperature is between 60° C. and 80° C.

6. The fuel cell based power generator of claim 1 and further comprising:
a hydrogen generator element temperature sensor positioned to sense a temperature of the hydrogen generator element; and
a recirculating hydrogen air path fan controller to receive temperature information from the hydrogen generator element temperature sensor and control the recirculating hydrogen air path fan speed to maintain the hydrogen generator element temperature at a selected temperature.

7. The fuel cell based power generator of claim 6 wherein the hydrogen generator element selected temperature is 80° C.

8. The fuel cell based power generator of claim 6 wherein the hydrogen generator element selected temperature is between 60° C.-100° C.

9. The fuel cell based power generator of claim 1 and further comprising:
a water exchanger element temperature sensor positioned to sense a temperature of the water exchanger element;
a recirculating hydrogen air path heat exchanger with fan disposed in the hydrogen air path coupled to the water exchanger element;
an ambient air path water heat exchanger element with fan disposed in the ambient air path coupled to the water exchanger element; and
a fan controller to receive temperature information from the water exchanger element temperature sensor and control heat exchanger fan speeds to maintain the water exchanger element temperature at a water exchanger selected temperature.

10. The fuel cell based power generator of claim 9 wherein the water exchanger element selected temperature is 40° C.

11. The fuel cell based power generator f claim 9 wherein the water exchanger element selected temperature is between 40° C. 60° C.

12. The fuel cell based power generator of claim 1 wherein the water exchanger element is coupled to receive warm wet air from the ambient air path, warm dry hydrogen from the recirculating hydrogen air path, exhaust hot dry air to ambient, and provide wet hydrogen to the hydrogen generator element via the recirculating hydrogen air path.

* * * * *